United States Patent
Nambu et al.

[11] Patent Number: 5,891,958
[45] Date of Patent: Apr. 6, 1999

[54] CURABLE COMPOSITION SUITABLE AS TOP COAT AND COATED MATERIAL USING THE SAME

[75] Inventors: Toshiro Nambu, Kobe; Seigo Nakamura, Kakogawa; Hirotoshi Kawaguchi, Kobe; Jiro Arioka, Takasogo; Masaharu Inoue, Kobe, all of Japan

[73] Assignee: Kanegafuchi Kagaku Kogyo Kabushiki Kaisha, Osaka, Japan

[21] Appl. No.: 765,366

[22] PCT Filed: May 9, 1996

[86] PCT No.: PCT/JP96/01235

§ 371 Date: Jan. 8, 1997

§ 102(e) Date: Jan. 8, 1997

[87] PCT Pub. No.: WO96/35758

PCT Pub. Date: Nov. 14, 1996

[30] Foreign Application Priority Data

May 11, 1995 [JP] Japan .................................... 7-113407
May 17, 1995 [JP] Japan .................................... 7-118611

[51] Int. Cl.⁶ .............................. C08F 8/00; C08L 83/06
[52] U.S. Cl. ......................... 525/100; 525/209; 428/447; 428/446
[58] Field of Search ...................... 525/100, 209

[56] References Cited

U.S. PATENT DOCUMENTS

| | | | |
|---|---|---|---|
| 5,051,473 | 9/1991 | Tabuchi et al. | 525/100 |
| 5,281,636 | 1/1994 | Nambu | 524/378 |
| 5,344,880 | 9/1994 | Nambu et al. | 525/100 |
| 5,409,994 | 4/1995 | Nakao et al. | 525/160 |
| 5,498,666 | 3/1996 | Nambu et al. | 525/100 |
| 5,602,204 | 2/1997 | Harimoto et al. | 525/209 |

FOREIGN PATENT DOCUMENTS

| | | |
|---|---|---|
| 6-025594 | 2/1994 | Japan . |
| 6-116530 | 5/1994 | Japan . |
| 6-128533 | 5/1994 | Japan . |
| 6-145453 | 5/1994 | Japan . |

*Primary Examiner*—Margaret W. Glass
*Attorney, Agent, or Firm*—Varndell Legal Group

[57] ABSTRACT

A curable composition suitable as a top coat which contains a vinyl copolymer (A) having a main chain consisting of a vinyl copolymer chain, in which a reactive silyl group is combined with a carbon atom at the main chain end and/or side chain of the copolymer, the copolymer having an alcoholic hydroxyl group at its main chain end and/or side chain and having an alcoholic hydroxyl group equivalent of 400 to 2000 g/mole, a non-aqueous hydroxyl group-containing polymer dispersion (B), a silicon-containing compound and/or its partical hydrolysis condensation product (C), and a curing catalyst (D), wherein the amount of (B) is 5 to 100 parts by weight, in terms of solid matter, based on 100 parts by weight of (A), the amount of (C) is 2 to 100 parts by weight based on 100 parts by weight of (A), and the amount of (D) is 0.001 to 10 parts by weight based on 100 parts by weight of the total amount of solid matters of (A), (B) and (C), and a coated material using the same.

7 Claims, No Drawings

CURABLE COMPOSITION SUITABLE AS TOP COAT AND COATED MATERIAL USING THE SAME

TECHNICAL FIELD

The present invention relates to a curable composition suitable as a top coat, which is suitably used for, for instance, automobiles, industrial equipments, steel furnitures, interior and exterior of buildings, household electric appliances, plastics and the like, and a coated material using the same. More particularly, the present invention relates to a curable composition suitable as a top coat, which shows an extremely excellent stain resistance in addition to excellent acid resistance, scratch resistance, appearance, thermosetting property and the like, and which can be suitably used as, in particular, a top coat for automobiles, and a coated material using the same.

BACKGROUND ART

Conventionally, coating materials mainly containing a melamine resin such as alkyd melamine or acrylic melamine have been used for coating automobiles, industrial equipments, steel furnitures, interior and exterior of buildings, household electric appliances, plastics and the like.

However, these coating materials mainly containing a melamine resin involve the problems that harmful formalin greatly generates during curing and that cured coating films are damaged by acid rain because they are poor in acid resistance. In particular, the problem of acid rain owing to air pollution assumes a serious aspect in recent years, and there is observed a phenomenon that etching, whitening or spotting occurs in the coating films.

As a curable composition suitable as a coat, which solves the above-mentioned problems, there are known a curable coating composition containing a blend of a vinyl copolymer having a hydrolyzable silyl group and an acrylic polyol, and a curable coating composition containing a copolymer of a vinyl monomer having a hydrolyzable silyl group and a vinyl monomer having an alcoholic hydroxyl group (Japanese Unexamined Patent Publication No. 141952/1989 and Japanese Unexamined Patent Publication No. 136324/1994).

However, the above-mentioned curable coating compositions are demanded to improve easiness in removal of adhered stains, namely stain resistance, from the viewpoints of beauty of appearance, easiness in cleaning, decrease in the number of cleaning operations and the like.

The present invention has been accomplished in consideration of the above-mentioned prior art, and aims at providing a curable composition suitable as a top coat showing an excellent stain resistance in addition to excellent acid resistance, scratch resistance, water resistance and thermosetting property, and a coated material using it.

DISCLOSURE OF THE INVENTION

The present invention relates to

① a curable composition suitable as a top coat which contains (A) a vinyl copolymer having a main chain consisting essentially of a vinyl copolymer chain, in which a reactive silyl group represented by the formula (I):

wherein $R^1$ is hydrogen atom or an alkyl group having 1 to 10 carbon atoms, $R^2$ is hydrogen atom or a monovalent hydrocarbon group selected from the group consisting of an alkyl group having 1 to 10 carbon atoms, an aryl group and an aralkyl group, and a is 0, 1 or 2, is combined with a carbon atom in the molecule at the main chain end and/or side chain of the copolymer, the copolymer having at least one alcoholic hydroxyl group at the main chain end and/or side chain and having an alcoholic hydroxyl group equivalent of 400 to 2000 g/mole, (B) non-aqueous dispersion of a hydroxyl group-containing polymer, (C) a silicon-containing compound represented by the formula (II):

wherein $R^3$ is a monovalent hydrocarbon group selected from the group consisting of an alkyl group having 1 to 10 carbon atoms, an aryl group and an aralkyl group, $R^4$ is a monovalent hydrocarbon group selected from the group consisting of an alkyl group having 1 to 10 carbon atoms, an aryl group and an aralkyl group, and b is 0 or 1, and/or a partial hydrolysis condensation product thereof, and (D) a curing catalyst, wherein the amount of the non-aqueous hydroxyl group-containing polymer dispersion (B) is 5 to 100 parts by weight, in terms of solid matter, based on 100 parts by weight of the vinyl copolymer (A), the amount of the silicon-containing compound and/or its partial hydrolysis condensation product (C) is 2 to 100 parts by weight based on 100 parts by weight of the vinyl copolymer (A), and the amount of the curing catalyst (D) is 0.001 to 10 parts by weight based on 100 parts by weight of the total amount of solid matters of the vinyl copolymer (A), the non-aqueous hydroxyl group-containing polymer dispersion (B) and the silicon-containing compound and/or its partial hydrolysis condensation product (C); and relates to ② a coated material obtained by coating a top coat clear coating material on a surface of a coating formed from a coating material containing a metallic powder and/or a color pigment, wherein the top coat clear coating material contains the above-mentioned curable composition as a main component.

In the present specification, the term "vinyl" indicates that a thing is derived from a compound containing a group having a polymerizable C=C bond such as vinyl group or vinylidene group.

BEST MODE FOR CARRYING OUT THE INVENTION

The curable composition suitable as a top coat of the present invention contains, as mentioned above, a vinyl copolymer (A) having a main chain consisting essentially of a vinyl copolymer chain, in which a reactive silyl group represented by the formula (I):

wherein $R^1$ is hydrogen atom or an alkyl group having 1 to 10 carbon atoms, $R^2$ is hydrogen atom or a monovalent hydrocarbon group selected from the group consisting of an alkyl group having 1 to 10 carbon atoms, an aryl group and an aralkyl group, and a is 0, 1 or 2, is combined with a carbon atom in the molecule at the main chain end and/or side chain of the copolymer, the copolymer having at least one alcoholic hydroxyl group at the main chain end and/or side chain and having an alcoholic hydroxyl group equivalent of 400 to 2000 g/mole, a non-aqueous hydroxyl group-containing polymer dispersion (B), a silicon-containing compound represented by the formula (II):

$$(R^3O)_{4-b}\text{—}Si\text{—}(R^4)_b \quad (II)$$

wherein $R^3$ is a monovalent hydrocarbon group selected from the group consisting of an alkyl group having 1 to 10 carbon atoms, an aryl group and an aralkyl group, $R^4$ is a monovalent hydrocarbon group selected from the group consisting of an alkyl group having 1 to 10 carbon atoms, an aryl group and an aralkyl group, and b is 0 or 1, and/or its partial hydrolysis condensation product (C), and a curing catalyst (D), wherein the amount of the non-aqueous hydroxyl group-containing polymer dispersion (B) is 5 to 100 parts by weight, in terms of solid matter, based on 100 parts by weight of the vinyl copolymer (A), the amount of the silicon-containing compound and/or its partial hydrolysis condensation product (C) is 2 to 100 parts by weight based on 100 parts by weight of the vinyl copolymer (A), and the amount of the curing catalyst (D) is 0.001 to 10 parts by weight based on 100 parts by weight of the total amount of solid matters of the vinyl copolymer (A), the non-aqueous hydroxyl group-containing polymer dispersion (B) and the silicon-containing compound and/or its partial hydrolysis condensation product (C).

Because the vinyl copolymer (A) (hereinafter referred to as "component (A)") used in the present invention has a main chain consisting essentially of a vinyl copolymer chain, a coating film formed from the obtained curable composition shows excellent weatherability, chemical resistance and the like. And also, because a reactive silyl group in the component (A) is combined with a carbon atom in its molecule, the coating film shows excellent water resistance, alkali resistance, acid resistance and the like. And further, because the component (A) has an alcoholic hydroxyl group in a specific amount, the composition is excellent in curability under the condition of heat curing and the like.

The component (A) may have at least one reactive silyl group represented by the formula (I) in its molecule, and it is desired that the number of the reactive silyl group is 2 to 15, preferably 2 to 10 from the viewpoint that a coating film formed from the obtained curable composition is excellent in solvent resistance.

In the formula (I), $R^1$ is hydrogen atom or an alkyl group having 1 to 10 carbon atoms, preferably an alkyl group having 1 to 4 carbon atoms, such as methyl group, ethyl group, n-propyl group, i-propyl group, n-butyl group, i-butyl group or t-butyl group. When the number of carbon atoms of the alkyl group is more than 10, reactivity of the reactive silyl group is lowered. Also, it is not desired that the above-mentioned $R^1$ is a group other than an alkyl group, such as phenyl group or benzyl group because reactivity of the reactive silyl group is lowered.

Also, in the formula (I), $R^2$ is hydrogen atom or a monovalent hydrocarbon group selected from the group consisting of an alkyl group having 1 to 10 carbon atoms, preferably an alkyl group having 1 to 4 carbon atoms, which is exemplified as a group showing the above-mentioned $R^1$, an aryl group preferably having 6 to 25 carbon atoms, such as phenyl group, and an aralkyl group preferably having 7 to 12 carbon atoms, such as benzyl group. Among them, an alkyl group is preferable from the viewpoint that the obtained curable composition is excellent in curability.

The above-mentioned component (A) has at least one alcoholic hydroxyl group at its main chain end and/or side chain. In order to improve acid resistance of a coating film formed from the obtained curable composition, the alcoholic hydroxyl group equivalent (the amount (g) of the component (A) containing 1 mole of the alcoholic hydroxyl group) is at least 400 g/mole, preferably at least 500 g/mole. Also, in order to improve thermosetting property of the curable composition and scratch resistance and impact resistance of the coating film, the alcoholic hydroxyl group equivalent is at most 2000 g/mole, preferably at most 1500 g/mole, more preferably at most 1000 g/mole.

Also, in order to obtain a curable composition showing excellent acid resistance, weatherability and the like, and in order to lower internal stress, it is desired that the reactive silyl group equivalent of the component (A) (the amount (g) of the component (A) containing 1 mole of the reactive silyl group represented by the formula (I)) is at least 380 g/mole, preferably at least 410 g/mole, more preferably at least 450 g/mole. Also, in order to improve curability of the curable composition, it is desired that the reactive silyl group equivalent is at most 5000 g/mole, preferably at most 3000 g/mole, more preferably at most 1500 g/mole.

Furthermore, from the viewpoint that a curable composition showing excellent thermosetting property, acid resistance, weatherability, water resistance and the like can be obtained, it is desired that the molar ratio of an alcoholic hydroxyl group to a reactive silyl group (alcoholic hydroxyl group/reactive silyl group) is at least 0.1, preferably at least 0.5, more preferably at least 0.7, and also, is at most 3, preferably at most 2.5, more preferably at most 2.

Moreover, in order for the above-mentioned molar ratio to be included in the above-mentioned range, for instance, there may be controlled the amount of a reactive silyl group-containing vinyl monomer and an alcoholic hydroxyl group-containing monomer which are used for preparation of the component (A).

The component (A) can be prepared, for instance, by polymerizing a polymerizable component (A) containing a reactive silyl group-containing vinyl monomer (hereinafter referred to as "monomer (A-1)"), an alcoholic hydroxyl group-containing vinyl monomer (hereinafter referred to as "monomer (A-2)"), other monomers copolymerizable therewith (hereinafter referred to as "monomer (A-3)") and the like.

Examples of the above-mentioned monomer (A-1) are, for instance, a compound represented by the formula (III):

$$\begin{array}{c} R^5 \ (R^2)_a \\ | \ \ | \\ CH_2\!=\!C\!-\!Si\!-\!(OR^1)_{3-a} \end{array} \quad (III)$$

wherein $R^1$, $R^2$ and a are as defined above, and $R^5$ is hydrogen atom or methyl group, such as

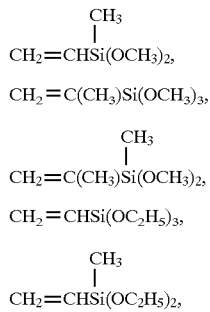

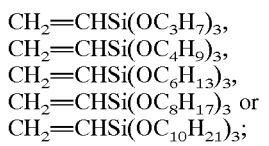

$CH_2=CHSi(OC_3H_7)_3$,
$CH_2=CHSi(OC_4H_9)_3$,
$CH_2=CHSi(OC_6H_{13})_3$,
$CH_2=CHSi(OC_8H_{17})_3$ or
$CH_2=CHSi(OC_{10}H_{21})_3$;

a compound represented by the formula (IV):

$$CH_2=\underset{R^5}{\overset{|}{C}}-COO(CH_2)_n\underset{(R^2)_a}{\overset{|}{Si}}-(OR^1)_{3-a} \quad (IV)$$

wherein $R^1$, $R^2$, $R^5$ and a are as defined above, and n is an integer of 1 to 12, such as $CH_2=CHCOO(CH_2)_3Si(OCH_3)_3$,

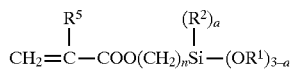

$CH_2=C(CH_3)COO(CH_2)_3Si(OCH_3)_3$,

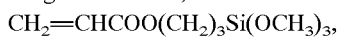

$CH_2=CHCOO(CH_2)_3Si(OC_2H_5)_3$,

$CH_2=C(CH_3)COO(CH_2)_3Si(OC_2H_5)_3$,

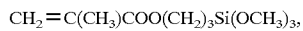

$CH_2=C(CH_3)COO(CH_2)_{11}Si(OCH_3)_3$;

a compound represented by the formula (V):

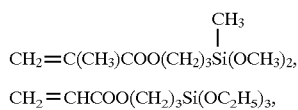

wherein $R^1$, $R^2$, $R^5$, a and n are as defined above, such as $CH_2=CH-CH_2OCO(o-C_6H_4)COO(CH_2)_3Si(OCH_3)_3$ or

a compound represented by the formula (VI):

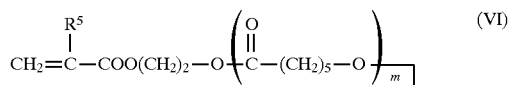

wherein $R^1$, $R^2$, $R^5$ and a are as defined above, and m is an integer of 1 to 14, such as

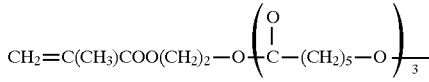

or

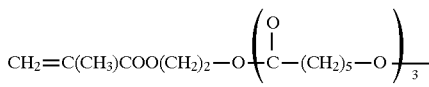

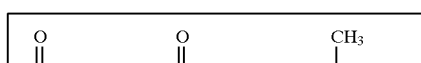

a compound represented by the formula (VII):

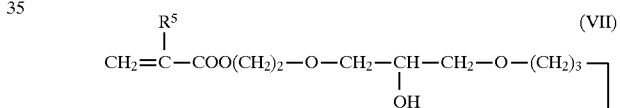

wherein $R^1$, $R^2$, $R^5$ and a are as defined above, and r is 0 or an integer of 1 to 22, such as

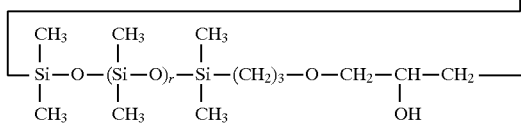

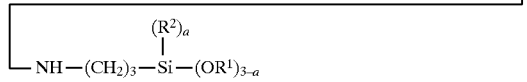

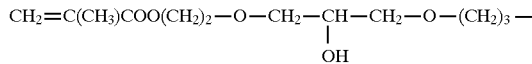

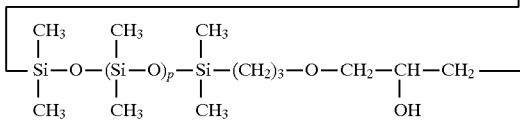

-continued

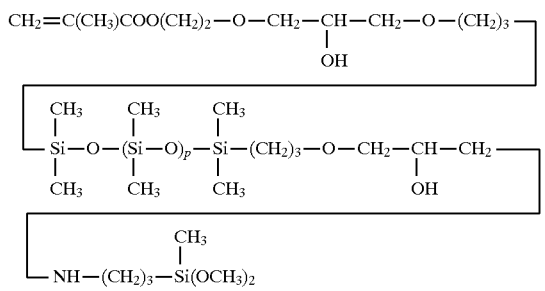

in which p is 0 or an integer of 1 to 20; a (meth)acrylate having the reactive silyl group represented by the formula (I) at its end through an urethane bond or a siloxane bond; and the like. These can be used alone or in an admixture thereof. Among them, the compound represented by the formula (V) is preferable from the viewpoint that its handling is easy, its cost is low and by-product and others are not produced.

In order to sufficiently improve acid resistance of a coating film formed from the obtained curable composition, it is desired that the amount of the above-mentioned monomer (A-1) is at least 5% by weight, preferably at least 10% by weight of the total amount of the polymerizable component (A). Also, in order to improve storage stability of the curable composition, it is desired that the amount of the monomer (A-1) is at most 60% by weight, preferably at most 50% by weight of the total amount of the polymerizable component (A).

Examples of the above-mentioned monomer (A-2) are, for instance, 2-hydroxyethyl (meth)acrylate, 1-hydroxypropyl (meth)acrylate, 2-hydroxypropyl (meth)acrylate, 2-hydroxyethyl vinyl ether, N-methylol (meth)acrylamide, ARONIX 5700 (which is a product made by Toagosei Chemical Industry Co., Ltd.), 4-hydroxystyrene, an acrylic acid ester oligomer having a terminal hydroxyl group, such as HE-10, HE-20, HP-1 or HP-20 (which are products of Nippon Shokubai Co., Ltd.), a compound such as BLEMMER PP series (polypropylene glycol methacrylate), BLEMMER PE series (polyethylene glycol monomethacrylate), BLEMMER PEP series (polyoxyethylene glycol polypropylene glycol methacrylate), BLEMMER AP-400 (polypropylene glycol monoacrylate), BLEMMER AE-350 (polyethylene glycol monoacrylate), BLEMMER NKH-5050 (polypropylene glycol polytrimethylene monoacrylate) or BLEMMER GLM (glycerol monomethacrylate) (which are products of Nippon Oil and Fats Co., Ltd.), an ε-caprolactone-modified hydroxyalkyl vinyl copolymerizable compound obtained by a reaction of a hydroxyl group-containing vinyl compound such as hydroxyalkyl acrylate, hydroxyalkyl methacrylate with ε-caprolactone, and the like.

Also, typical examples of the above-mentioned ε-caprolactone-modified hydroxyalkyl vinyl copolymerizable compound are, for instance, a compound represented by the formula (IX):

wherein $R^6$ is hydrogen atom or methyl group, and q is an integer of 1 or more. Concrete examples of the compound are, for instance, Placcel FA-1 ($R^6$ is hydrogen atom, q is 1), Placcel FA-4 ($R^6$ is hydrogen atom, q is 4), Placcel FM-1 ($R^6$ is methyl group, q is 1), Placcel FM-4 ($R^6$ is methyl group, q is 4) (which are products of Daicel Chemical Industries, Ltd.), TONE M-100 ($R^6$ is hydrogen atom, q is 2), TONE M-201 ($R^6$ is methyl group, q is 1) (which are products of Union Carbide Corporation), and the like.

The above-mentioned monomer (A-2) can be used alone or in an admixture thereof.

Among the above-mentioned monomer (A-2), 2-hydroxypropyl (meth)acrylate, 2-hydroxyethyl (meth)acrylate and the ε-caprolactone-modified hydroxyalkyl vinyl copolymerizable compound, particularly 2-hydroxypropyl (meth)acrylate, are preferable from the viewpoint that a coating film formed from the obtained curable composition is excellent in acid resistance and water resistance.

In order for the obtained curable composition to exhibit sufficient curability, it is desired that the amount of the above-mentioned monomer (A-2) is at least 5% by weight, preferably at least 7% by weight of the total amount of the polymerizable component (A). Also, in order to improve water resistance and acid resistance of a coating film formed from the curable composition, it is desired that the amount of the monomer (A-2) is at most 50% by weight, preferably at most 35% by weight of the total amount of the polymerizable component (A).

Examples of the above-mentioned monomer (A-3) are, for instance, methyl (meth)acrylate, ethyl (meth)acrylate, n-butyl (meth)acrylate, isobutyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, (meth)acrylonitrile, glycidyl (meth)acrylate, dimethylaminoethyl (meth)acrylate, diethylaminoethyl (meth)acrylate, (meth)acrylamide, α-ethyl (meth)acrylamide, N-methyl (meth)acrylamide, N,N-dimethyl (meth)acrylamide, N-butoxymethyl (meth)acrylamide, macromers such as AS-6, AN-6, AA-6, AB-6 and AK-5 (which are available from Toagosei Chemical Industry Co., Ltd.), a phosphoric ester group-containing vinyl compound such as a condensation product of a hydroxyalkyl ester of α, β-ethylenically unsaturated carboxylic acid, e.g. a hydroxyalkyl ester of (meth)acrylate with phosphoric acid or a phosphoric acid ester, or an acrylate or methacrylate containing an urethane bond or siloxane bond; an aromatic hydrocarobn vinyl compound such as styrene, α-methylstyrene, chlorostyrene, styrenesulfonic acid, 4-hydroxystyrene or vinyl toluene; an unsaturated carboxylic acid such as maleic acid, fumaric acid or itaconic acid, its salt such as alkali metal salt, ammonium salt or amine salt; anhydride or unsaturated carboxylic acid such as maleic anhydride, and an ester of the unsaturated carboxylic acid, e.g. a diester or half eater of the unsaturated carboxylic acid or anhydride with an alcohol having linear or branched alcohol having 1 to 20 carbon atoms; vinyl ester and allyl compounds such as vinyl acetate, vinyl propionate or diallyl phthalate; an amino group-containing vinyl compound such as vinylpyridine or aminoethyl vinyl ether; an amido group-containing vinyl compound such as itaconic acid diamide, crotonamide, maleic acid diamide, fumaric acid diamide or N-vinylpyrrolidone; other vinyl compounds such as methyl vinyl ether, cyclohexyl vinyl ether, vinyl chloride, vinylidene chloride, chloroprene, propylene, butadiene, isoprene, fluoroolefin, maleimide, N-vinylimidazole and vinylsulfonic acid, and the like. These can be used alone or in an admixture thereof.

In consideration of, for instance, the amount of the above-mentioned monomer (A-1) and monomer (A-2), it is desired that the amount of the above-mentioned monomer (A-3) is properly adjusted so that the total amount of the polymerizable component (A) becomes 100% by weight.

Moreover, when a polar monomer having a group such as amino group, carboxyl group, sulfonic acid group or phosphoric acid group is used as the above-mentioned monomer (A-3), it is desired that its amount is adjusted to at most 5% by weight of the total amount of the polymerizable component (A) in order to minimize occurrence of crosslinking reaction at the time of polymerization.

In the present invention, in order to improve weatherability, solvent resistance, impact resistance and the like of a coating film formed from the obtained curable composition, segments composed of urethane bonds or siloxane bonds may be contained in the main chain of the component (A) in an amount not exceeding 50% by weight of the component (A).

The component (A) used in the present invention can be prepared from the polymerizable component (A) containing, for instance, the above-mentioned monomer (A-1), monomer (A-2), monomer (A-3) and the like by a method, for instance, described in Japanese Unexamined Patent Publication No. 36395/1979, Japanese Unexamined Patent Publication No. 55954/1982 or the like. Moreover, it is desired that the component (A) is prepared by a solution polymerization method comprising using an azo radical polymerization initiator such as azobisisobutyronitrile from the viewpoint of easiness in synthesis and the like.

A polymerization solvent used in the above-mentioned solution polymerization method is not particularly limited so long as it is non-reactive. Examples of the polymerization solvent are, for instance, a hydrocarbon such as toluene, xylene, n-hexane or cyclohexane; an acetic acid ester such as ethyl acetate or butyl acetate; an alcohol such as methanol, ethanol, isopropanol or n-butanol; an ether such as ethyl cellosolve, butyl cellosolve or cellosolve acetate; a ketone such as methyl ethyl ketone, ethyl acetoacetate, acetylacetone, diacetone alcohol, methyl isobutyl ketone or acetone; and the like. These can be used alone or in an admixture thereof.

Moreover, it is desired that the polymerization solvent is adjusted so as to contain 1 to 30 parts (parts by weight, hereinafter the same) or so of an alcohol based on 100 parts of the polymerizable component (A) therein, since gellation may occur during the polymerization when the amount of the alcohol such as methanol or butanol in the polymerization solvent is less than 1 part based on 100 parts of the polymerizable component (A).

Also, the molecular weight of the obtained component (A) can be controlled by using a chain transfer agent when the above-mentioned solution polymerization method is employed.

Concrete examples of the above-mentioned chain transfer agent are, for instance, n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, $(CH_3O)_3Si—S—S—Si(OCH_3)_3$, $(CH_3O)_3Si—S_8—Si(OCH_3)_3$, and the like. These can be used alone or in an admixture thereof.

For instance, it is desired that a chain transfer agent having a hydrolyzable silyl group in its molecule, such as γ-mercaptopropyltrimethoxysilane, is used because it is possible to introduce a hydrolyzable silyl group into the component (A) at the main chain end.

Moreover, it is desired that the amount of the above-mentioned chain transfer agent is 0.1 to 10 parts or so based on 100 parts of the total amount of the polymerizable component (A).

From the viewpoint that the obtained curable composition is excellent in thermosetting property and a coating film formed from the curable composition is excellent in physical properties such as durability, it is desired that the number average molecular weight of the thus obtained component (A) is 1000 to 20000, preferably 2000 to 15000, more preferably 3000 to 10000.

In the present invention, the above-mentioned component (A) can be used alone or in an admixture thereof.

The non-aqueous hydroxyl group-containing polymer dispersion (B) (hereinafter referred to as "component (B)") used in the present invention is a component used for imparting durability, scratch resistance and the like to a coating film formed from the obtained curable composition, and is a necessary component from the viewpoint of control of rheology of coating materials.

Now, a non-aqueous polymer dispersion is, as shown in a literature (K. E. J. Barrett, Dispersion Polymerization in Organic Media, John Wiley & Sons, London, 1975, and so on), a dispersion comprising a coating film-forming polymer which is stably dispersed in a solvent other than water. The polymer is composed of a core part (1) and an arm part (2), and the core part (1) is insoluble in the solvent and the arm part (2) is soluble in the solvent. Also, the core part (1) and the arm part (2) are bonded thereto, for instance, by a bond formed by the reaction of carboxyl group with epoxy group. As the above-mentioned solvent, there are mainly used, for instance, low polar hydrocarbon solvents such as cyclohexane, heptane, xylene and mineral spirits. However, an alcohol such as 1-butanol or methanol and a ketone such as acetone or cyclohexanone may be used together with the above-mentioned hydrocarbon solvent so long as the core part (1) is insoluble in the solvent and the arm part (2) is soluble in the solvent.

The core part (1) comprises a macropolymer having a number average molecular weight of preferably 15000 to 300000, more preferably 30000 to 250000, and the arm part (2) forms a three-dimensional barrier for, for instance, a stabilizer and is a macromonomer chain bonded to the core part (1).

The core part (1) is formed from a (co)polymer obtained by polymerizing a polymerizable component (B-1) containing a vinyl monomer.

The vinyl monomer used for preparing the (co)polymer which forms the core part (1) is not particularly limited so long as the core part (1) having desired properties can be prepared. Concrete examples of the vinyl monomer are, for instance, (meth)acrylic acid; an ester such as an alkyl ester of the (meth)acrylic acid, a hydroxyalkyl ester, an allyl ester or glycidyl ester; styrene, acrylonitrile, and the like.

It is desired that the core part (1) used in the present invention is formed from a (co)polymer obtained by polymerizing a polymerizable component (B-1) comprising 10 to 50% by weight, preferably 15 to 40% by weight of at least one member of vinyl monomers having hydroxyl group and 50 to 90% by weight, preferably 60 to 85% by weight of at least one member of vinyl monomers having no hydroxyl group. When the amount of the vinyl monomer having hydroxyl group is less than the above-mentioned lower limit, there is a tendency that polar difference between the core part (1) and the arm part (2) becomes small, so that the component (B) becomes instable and easily aggregates. Also, when the amount of the vinyl monomer having hydroxyl group is more than the above-mentioned upper limit, there is a tendency that, for instance, water resistance of a coating film formed from the curable composition is easily lowered.

The arm part (2) bonded to the core part (1) is, as the same as the core part (1), formed from a (co)polymer obtained by polymerizing a polymerizable component (B-2) containing a vinyl monomer.

The vinyl monomer used for preparing the (co)polymer which forms the arm part (2) is not particularly limited so long as the arm part (2) having desired properties can be prepared. Concrete examples of the vinyl monomer are, for instance, (meth)acrylic acid; an ester such as an alkyl ester of the (meth)acrylic acid, a hydroxyalkyl ester, an allyl ester or glycidyl ester; styrene, acrylonitrile, and the like.

In order to avoid the possibility that viscosity of the component (B) becomes high and precipitate is generated owing to the lowering of stability, it is desired that the arm part (2) which is bonded to the core part (1) accounts for, as usual, at least 10% by weight, preferably at least 20% by weight of the whole of component (B). Also, in order to improve durability of a coating film formed from the curable composition, it is desired that the arm part (2) accounts for at most 90% by weight, preferably at most 50% by weight of the whole of component (B).

It is desired that the arm part (2) (organic solvent-soluble polymer) of the component (B) used in the present invention is formed from a (co)polymer obtained by polymerizing a polymerizable component (B-2) comprising 5 to 30% by weight, preferably 5 to 25% by weight of at least one member of vinyl monomers having hydroxyl group and 70 to 95% by weight, preferably 75 to 95% by weight of at least one member of other vinyl monomers having no hydroxyl group. When the amount of the vinyl monomer having hydroxyl group is less than the above-mentioned lower limit, there is a tendency that curability of the curable composition is easily lowered. Also, when the amount of the vinyl monomer having hydroxyl group is more than the above-mentioned upper limit, there are tendencies that solubility of the arm part (2) in organic solvents is lowered and that stability of the component (B) easily becomes insufficient.

It is desired that the number average molecular weight of the arm part (2) formed from the above-mentioned (co) polymer is 1000 to 25000, preferably 2000 to 10000 from the viewpoint of dispersing stability and viscosity.

When the component (B) is prepared, there can be employed, for instance, a method comprising firstly carrying out the polymerization of the arm part (2) soluble in an organic solvent, next carrying out the polymerization of the core part (1) insoluble in the organic solvent, and then preparing a polymer dispersed in the organic solvent, having the arm part (2) soluble in the organic solvent, which is bonded to the core part (1) insoluble in the organic solvent, and the like.

When the component (B) is prepared, usually, the arm part (2) which is a polymer soluble in an organic solvent are firstly prepared, and other solvents and additives may be used during its preparation or after its preparation so long as the polymer is soluble.

Next, the polymerizable component (B-1) used for preparing a (co)polymer which forms the core part (1) is added to a reaction system and the polymerization is carried out, and a polymer corresponding to the arm part (2) or a solvent can be also added to the reaction system during the polymerization. A method for adding components such as the polymerizable component (B-1) used for preparing the core part (1), the polymer corresponding to the arm part (2), other solvents and additives to the reaction system is not particularly limited. For instance, the polymerization may be carried out by adding all components such as the polymerizable component (B-1) to the reaction system at the initial stage of polymerization for preparing the core part (1), or by adding a part of components such as the polymerizable component (B-1) to the reaction system at the initial stage of polymerization and then adding the residual components to the reaction system according to the progress of polymerization, or by adding all components such as the polymerizable component (B-1) to the reaction system according to the progress of polymerization. Also, it is possible that after the components such as the polymerizable component (B-1) used for preparing the core part (1), the polymer corresponding to the arm part (2), the other solvents and the additives are mixed with each other, they are added to the reaction system, and other components are separately added to the reaction system at the same stage or at any other stage. When each component is added to the reaction system according to the progress of polymerization, it may be intermittently added thereto and it may be continuously added thereto. In the present invention, there are no particular limitations in the time and manner for adding the components such as polymerizable component (B-1) to the reaction system, the amount of each component and the like, so long as the desired component (B) composed of the core part (1) and the arm part (2) bonded thereto can be prepared.

The component (B) used in the present invention is prepared as mentioned above. In the present invention, from the viewpoints that the component (B) is excellent in solubility in organic solvents and that the obtained curable composition is excellent in curability, it is desired that the component (B) is a polymer which is obtained by polymerizing a polymerizable component (B-1) containing at least one member of vinyl monomers having hydroxyl group and at least one member of vinyl monomers having no hydroxyl group in an organic solvent solution containing an organic solvent-soluble polymer having a number average molecular weight of 1000 to 25000 and being obtained by polymerizing a polymerizable component (B-2) comprising 5 to 30% by weight of at least one member of vinyl monomers having hydroxyl group and 70 to 95% by weight of at least one member of vinyl monomers having no hydroxyl group, and which is insoluble in the above-mentioned organic solvent and is dispersed in the organic solvent.

The concentration of solid matter of the component (B) is not particularly limited, and it is desired that the concentration is 50 to 70% by weight or so, preferably 60 to 70% by weight or so because operation during the preparation and handling after the preparation are easy and excellent storage stability is exhibited.

In order to sufficiently control rheology of coating materials, it is desired that the average particle diameter of dispersed particle which is the component (B) is at least 100 nm, preferably at least 150 nm, more preferably at least 200 nm. Also, in order to improve storage stability, it is desired that the average particle diameter is at most 2000 nm, preferably at most 1000 nm, more preferably at most 600 nm. Moreover, the average particle diameter and the average molecular weight of the dispersion particle are not particularly limited so far as the control of rheology and storage stability are good.

In order to decrease the possibility that sag is generated and crack is generated on the formed coating film when a coating material using the obtained curable composition is coated on a perpendicular plane, the amount of the above-mentioned component (B) is at least 5 parts, preferably at least 10 parts based on 100 parts of the component (A). Also, in order to decrease the possibility that acid resistance, water resistance and the like of the coating film are lowered, the amount of the component (B) is at most 100 parts, preferably at most 70 parts, more preferably at most 60 parts based on 100 parts of the component (A).

Moreover, in order to decrease the possibility that acid resistance and water resistance of the coating film are lowered, it is desired that the proportion of the component (A) to the component (B) is adjusted so that the number of the alcoholic hydroxyl group in the arm part (2) of the component (B) is less than 0.2, preferably less than 0.1 and at least 0.001 per one $R^1O$—Si group in the component (A).

Also, in the present invention, from the viewpoint that a coating film formed from the obtained curable composition is excellent in appearance, scratch resistance and acid resistance, it is desired that as the component (A) and the component (B), there is used a product obtained by polymerizing a mixture of the polymerizable component (A) containing the monomer (A-1), the monomer (A-2) and the monomer (A-3), and the component (B), for instance, by a polymerization method employed in the preparation of the component (A). Moreover, the product may be a mixture of the component (A) and the component (B), and may be a reactant, for instance, obtained by the reaction of the reactive silyl group based on the monomer (A-1) in the component (A) with the hydroxyl group in the component (B).

When the above-mentioned product is prepared, in order to more improve acid resistance and water resistance of the formed coating film, it is desired that the proportion of the polymerizable component (A) to the component (B) is adjusted so that the amount of the polymerizable component (A) is at least 60% by weight, preferably at least 80% by weight of the mixture, that is, the amount of the component (B) is at most 40% by weight, preferably at most 20% by weight of the mixture. Also, in order to avoid the lowering of impact resistance of the formed coating film, it is desired that the proportion is adjusted so that the amount of the polymerizable component (A) is at most 90% by weight, preferably at most 80% by weight of the mixture, that is, the amount of the component (B) is at least 10% by weight, preferably at least 20% by weight of the mixture.

The silicon-containing compound and/or the condensate of its partial hydrolysis product (C) (hereinafter referred to as "component (C)") used in the present invention is a component used for improving stain resistance of a coating film formed from the obtained curable composition.

In the formula (II) which represents the above-mentioned component (C), $R^3$ is a monovalent hydrocarbon group selected from the group consisting of an alkyl group having 1 to 10 carbon atoms, preferably an alkyl group having 1 to 4 carbon atoms, an aryl group, preferably an aryl group having 6 to 9 carbon atoms, and an aralkyl group, preferably an aralkyl group having 7 to 9 carbon atoms, and $R^4$ is a monovalent hydrocarbon group selected from the group consisting of an alkyl group having 1 to 10 carbon atoms, preferably an alkyl group having 1 to 4 carbon atoms, an aryl group, preferably an aryl group having 6 to 9 carbon atoms, and an aralkyl group, preferably an aralkyl group having 7 to 9 carbon atoms. Also, b is 0 or 1, that is, 3 to 4 ($R^3O$) groups are in the same molecular. Moreover, 3 to 4 ($R^3O$) groups in the same molecular may be the same or different from each other.

Concrete examples of the alkyl group having 1 to 10 carbon atoms, preferably the alkyl group having 1 to 4 carbon atoms, the aryl group having 6 to 9 carbon atoms and the aralkyl group having 7 to 9 carbon atoms in the above-mentioned $R^3$ or $R^4$ are the groups exemplified as groups which show $R^2$ in the above-mentioned formula (I), and the like.

Concrete examples of the above-mentioned silicon-containing compound are, for instance, a tetraalkyl silicate such as tetramethyl silicate, tetraethyl silicate, tetra-n-propyl silicate, tetra-i-propyl silicate, tetra-n-butyl silicate, tetra-i-butyl silicate or tetra-t-butyl silicate; a trialkoxysilane or a triaryloxysilane such as an alkyltrialkoxysilane such as methyltrimethoxysilane, methyltriethoxysilane, octadecyltriethoxysilane, methyltri-sec-octyloxysilane, methyltriisopropoxysilane or methyltributoxysilane, an aryltrialkoxysilane such as phenyltrimethoxysilane or phenyltriethoxysilane, an alkyltriaryloxysilane such as methyltriphenoxysilane, or a glycidoxytrialkoxysilane such as 3-glycidoxypropyltrimethoxysilane; and the like.

Also, Examples of the above-mentioned condensate of a partial hydrolysis product of the silicon-containing compound are, for instance, condensates obtained by adding water to the above-mentioned tetraalkyl silicate, trialkoxysilane, triaryloxysilane and the like, and partially hydrolyzing and condensating them by an usual method. Their concrete examples are, for instance, condensates of partial hydrolysis product of a tetraalkyl silicate, such as MSI51, ESI40, HAS-1 and HAS-10 (which are available from COLCOAT CO., LTD.); condensates of partial hydrolysis product of a trialkoxysilane, such as AFP-1 (which is available from Shin-Etsu Chemical Co., Ltd.); and the like.

Moreover, the above-mentioned MSI51 is a condensate of partial hydrolysis product, represented by the formula:

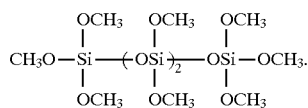

Also, the above-mentioned ESI40 is a condensate of partial hydrolysis product, represented by the formula:

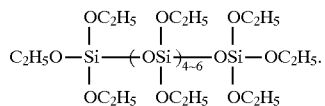

The component (C) can be used alone or in an admixture thereof. From the viewpoints that compatibility with the component (A) and the component (B) and curability of the obtained curable composition are excellent, and that fixing of stained substance can be inhibited because hardness of a coating film formed from the curable composition is high, among the components (C), tetraalkyl silicates and/or condensates of its partial hydrolysis product, such as ESI28, ESI40 and MSI51 are preferable.

In order to sufficiently improve stain resistance of a coating film, the amount of the above-mentioned component (C) is at least 2 parts, preferably at least 5 parts, more preferably at least 10 parts based on 100 parts of the component (A). Also, in order to avoid the possibility that impact resistance of the coating film is lowered, the amount of the component (C) is at most 100 parts, preferably at most 80 parts based on 100 parts of the component (A).

The curing catalyst (D) (hereinafter referred to as "component (D)") used in the present invention is not particularly limited, and there can be used catalysts which are used as curing catalysts for a reactive silyl group-containing compound and the like.

Concrete examples of the above-mentioned component (D) are, for instance, an organotin compound such as dibutyl tin dilaurate, dibutyl tin dimaleate, dioctyl tin dilaurate, dioctyl tin dimaleate or tin octylate; phosphoric acid or a phosphoric acid ester such as phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate or didecyl phosphate; an addition reaction product of phosphoric acid and/or phosphoric acid monoester with an epoxy compound such as propylene oxide, butylene oxide, cyclohexene oxide, glycidyl methacrylate, glycidol, acryl glycidyl ether γ-glycidoxypropyltrimethoxysilane, γ-glycidoxypropyltriethoxysilane, γ-glycidoxypropylmethyldimethoxysilane, Cardula E, or Epikote 828 and Epikote 1001 (which are available from Yuka Shell Epoxy Kabushiki Kaisha); an organotitanium compound; an organoaluminum compound; an organozinc compound; a carboxylic acid compound (organocarboxylic acid compound) such as maleic acid, adipic acid, azelaic acid, sebacic acid, itaconic acid, citric acid, succinic acid, phthalic acid, trimellitic acid or pyromellitic acid, and its anhydride; a sulfonic acid compound (organosulfonic acid compound) such as dodecylbenzenesulfonic acid, p-toluenesulfonic acid, 1-naphthalenesulfonic acid or 2-naphthalenesulfonic acid; compounds (reactants (salts) of an acid with an amine) such as NACURE5225, NACURE5543 and NACURE5925 (which are available from KING INDUSTRIES), obtained by blocking the above-mentioned sulfonic acid compound with a nitrogen-containing compound such as 1-amino-2-propanol, monoethanolamine, diethanolamine, 2-(methylamino) ethanol, 2-dimethylethanolamine, 2-amino-2-methyl-1-propanol, diisopropanolamine, 3-aminopropanol, 2-methylamino-2-methylpropanol, morpholine, oxazoline, 4,4-dimethyloxazoline or 3,4,4-trimethyloxazoline; an amine such as hexylamine, di-2-ethylhexylamine, N,N-dimethyldodecylamine, dodecylamine, 1,4-diazabicyclo[2, 2,2]octane, 1,8-diazabicyclo[5,4,0]undecene-7, morpholine or diisopropanolamine; a reactant of the amine with an acid phosphoric acid ester; an alkaline compound such as sodium hydroxide or potassium hydroxide; and the like. The above-mentioned component (D) can be used alone or in an admixture thereof.

From the viewpoint that the balance of curability during baking and storage stability at ordinary temperature is good, among the above-mentioned components (D), a sulfonic acid compound blocked with a nitrogen-containing compound (salt of nitrogen-containing compound and sulfoic acid compound, and the like) is preferable. Furthermore, it is desired that the above-mentioned nitrogen-containing compound is at least one compound selected from the group consisting of a primary or secondary amine compound having at least one hydroxyl group, preferably at most two hydroxyl groups in one molecule, such as 2-amino-2-methyl-1-propanol or diisopropanolamine, morpholine and oxazoline. Concrete examples of the sulfonic acid compound blocked with the nitrogen-containing compound are, for instance, NACURE5225, NACURE5543 and NACURE5925 (which are available from KING INDUSTRIES), and the like. Also, the preferable curing catalysts may be used together with the above-mentioned organotin compound and phosphoric acid or the phosphoric acid ester.

It is desired that the equivalent ratio of the above-mentioned nitrogen-containing compound to the sulfonic acid compound is 1:0.75 to 1:3.0, preferably 1:1.0 to 1:2.0. When the equivalent ratio is less than the above-mentioned lower limit, there is a tendency that storage stability at ordinary temperature and appearance are lowered. Also, when the equivalent ratio is more than the above-mentioned upper limit, there are tendencies that curability during baking is lowered and that a coating film turns to yellow.

In order to sufficiently improve curability of the curable composition, the amount of the component (D) is at least 0.001 part, preferably at least 0.05 part based on 100 parts of the total amount of solid matters of the component (A), the component (B) and the component (C). Also, in order to avoid the possibility that appearance of a coating film is lowered, the amount of the component (D) is at most 10 parts, preferably at most 6 parts based on 100 parts of the total amount of solid matters of the component (A), the component (B) and the component (C).

In order to improve curability of the curable composition and appearance of a coating film, in addition to the component (A), the component (B), the component (C) and the component (D), it is desired that an amino resin (E) (hereinafter referred to as "component (E)") is added to the curable composition of the present invention.

Concrete examples of the above-mentioned component (E) are, for instance, an amino resin (methylolated amino resin such as melamine resin, urea resin or guanamine resin) obtained by the reaction of an amino component such as melamine, urea, benzoguanamine, glycolurea, acetoguanamine or dicyandiamide with an aldehyde such as formaldehyde, paraformaldehyde, acetaldehyde or benzaldehyde; and the like.

From the viewpoints that finishing appearance is improved and that curability is good, among the above-mentioned amino resins, melamine resin is preferably used.

Also, there may be used an etherified amino resin obtained by, for instance, further etherifying the above-mentioned amino resin such as a methylolated amino resin with an alcohol such as methyl alcohol, ethyl alcohol, n-propyl alcohol, i-propyl alcohol, n-butyl alcohol, i-butyl alcohol, 2-ethylbutanol or 2-ethylhexanol.

Concrete examples of the above-mentioned etherified amino resin are, for instance, n-butylated melamine resins such as UVAN20SE, 20SE-60, UVAN128, UVAN220, UVAN225, UVAN20SB, UVAN20SE-60, UVAN21R, UVAN22R, UVAN122, UVAN28-60, UVAN20HS, UVAN2028, UVAN202 and UVAN120 (which are available from MITSUI TOATSU CHEMICALS, INC.); isobutylated melamine resins such as UVAN62, UVAN69-1, UVAN169 and UVAN2061 (which are available from MITSUI TOATSU CHEMICALS, INC.); butylated urea resins such as UVAN10S-60 and UVAN10R (which are available from MITSUI TOATSU CHEMICALS, INC.); melamine resins such as CYMEL303, CYMEL232, CYMEL370, CYMEL325, CYMEL236, CYMEL738, CYMEL771, CYMEL327, CYMEL703, CYMEL701, CYMEL266, CYMEL267, CYMEL285, CYMEL235, CYMEL238, CYMEL1141, CYMEL272, CYMEL254, CYMEL202, CYMEL1156, CYMEL1158, CYMEL300, CYMEL301, CYMEL350 and CYMEL736 (which are available from MITSUI-CYTEC, LTD.); and the like. From the viewpoint that curability of the curable composition is more improved, among them, alkyl etherified melamine resins such as CYMEL235, CYMEL238 and CYMEL1158 are preferable.

In order to avoid the possibility that acid resistance of a coating film formed from the obtained curable composition is lowered, it is desired that the amount of the above-mentioned component (E) is at most 30 parts, preferably at most 15 parts, more preferably at most 5 parts based on 100 parts of the total amount of solid matters of the component (A) and the component (B). Moreover, in order to sufficiently exhibit the effect for improving curability on the basis of the use of the component (E), it is desired that the amount of the component (E) is at least 1 part, preferably at least 2 parts based on 100 parts of the total amount of solid matters of the component (A) and the component (B).

Also, in order to improve thermosetting property of the composition and impact resistance of a coating film formed from the composition, hydroxyl group-containing high molecular compounds such as acrylic polyol, polycarbonato diol and polyester diol may be added to the curable composition of the present invention so that the molar ratio of an alcoholic hydroxyl group to a reactive silyl group (alcoholic hydroxyl group/reactive silyl group) is within the range of 0.1 to 3.

By further adding a dehydrating agent and a specific solvent to the curable composition of the present invention, storage stability of the curable composition can be more improved.

Examples of the above-mentioned dehydrating agent are, for instance, methyl orthoformate, ethyl orthoformate, methly orthoacetate, ethyl orthoacetate and the like. These can be used alone or in an admixture thereof.

The above-mentioned dehydrating agent may be added to the polymerizable component (A) during the polymerization of the component (A), and may be added to the component (A) after the polymerization. In order to avoid the possibility that a defect such as pinhole is generated on a coating film formed from the obtained curable composition, it is desired that the amount of the dehydrating agent is at most 70 parts, preferably at most 50 parts, more preferably at most 20 parts based on 100 parts of the component (A).

Also, examples of the above-mentioned solvent are, for instance, an alkyl alcohol in which an alkyl group has 1 to 10 carbon atoms, and the like. Concrete examples of the alkyl alcohol are, for instance, methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol and the like. These can be used alone or in an admixture thereof.

The amount of the above-mentioned solvent is not particularly limited. In order to avoid the possibility that a defect such as foaming (foaming phenomenon) is generated on a coating film formed from the obtained curable composition, it is desired that the amount of the solvent is, as usual, at most 70 parts, preferably at most 50 parts, more preferably at most 20 parts based on 100 parts of the component (A). Also, when the solvent is used alone without using the above-mentioned dehydrating agent, it is desired that the amount of the solvent is, as usual, 0.5 to 70 parts, preferably 1 to 50 parts, more preferably 2 to 20 parts based on 100 parts of the component (A).

By adding, for instance, an ultraviolet absorber, a light stabilizer and the like to the curable composition suitable as a top coat of the present invention, weatherability of a coating film formed from the curable composition can be improved. Particularly, by using these at the same time, weatherability can be more improved.

Examples of the above-mentioned ultraviolet absorber are, for instance, a benzophenone absorber, a triazole absorber, a phenylsalicylate absorber, a diphenyl acrylate absorber, an acetophenone absorber and the like. These can be used alone or in an admixture thereof.

It is desired that the amount of the above-mentioned ultraviolet absorber is, as usual, 0.1 to 10 parts, preferably 1 to 5 parts based on 100 parts of the total amount of solid matters of the curable composition.

Examples of the above-mentioned light stabilizer are, for instance, bis(2,2,6-tetramethyl-4-piperidyl) sebacate, bis(1, 2,2,6,6-pentamethyl-4-piperidyl) sebacate, bis(1,2,2,6,6-pentamethyl-4-piperidyl) 2-(3,5-di-tert-butyl-4-hydroxybenzyl)-2-n-butylmalonate, tetrakis(2,2,6,6-tetramethyl-4-piperidyl)-1,2,3,4-butanetetracarboxylate, tetrakis( 1,2,2,6,6-pentamethyl-4-piperidyl) -1,2,3,4-butanetetracarboxylate and the like. These can be used alone or in an admixture thereof.

It is desired that the amount of the above-mentioned light stabilizer is, as usual, 0.1 to 10 parts, preferably 1 to 5 parts based on 100 parts of the total amount of solid matters of the curable composition.

A method for preparing the curable composition of the present invention is not particularly limited, and there can be employed, for instance, a method comprising mixing the component (A), the component (B), the component (C), the component (D) and, as occasion demands, an optional component such as the component (E) with each other in an appropriately adjusted amount, and the like.

The curable composition of the present invention is utilized for the coating of automobiles, industrial equipments, steel furnitures, interior and exterior of buildings, household electric appliances, plastics and the like, and is, in particular, extremely utilized as a top coat for automobiles.

Next, the coated material using the above-mentioned curable composition of the present invention will be explained.

The coated material of the present invention is obtained by coating a top coat clear coating material containing the curable composition of the present invention as a main component on a surface of a coating formed by coating a coating material containing a metallic powder and/or a color pigment on a coating object such as steel sheet, plastic such as polypropylene, polycarbonate or ABS resin, or FRP.

The above-mentioned coating material (base coat) containing a metallic powder and/or a color pigment is not particularly limited. Examples of the above-mentioned coating material (base coat) are, for instance, a coating material comprising, as main components, aminoalkyd resin, oil free alkyd resin, thermosetting acrylic resin, thermosetting urethane resin, nitrocellulose lacquer, modified acrylic lacquer, slate acrylic lacquer, room temperature curing urethane resin, acrylic enamel resin, acid cured alkyd resin, acid curing modified (cellulose acetate butyrate and the like) alkyd resin, room temperature or heat curing fluorine resin, hydrolyzable silyl group-containing resin, the curable composition of the present invention, a mixture thereof and the like, and containing the metallic powder and/or the color pigment; and the like.

The above-mentioned coating material containing metallic powder and/or color pigment may be any of coating materials such as a solvent type coating material in which an organic solvent is a medium, a non-aqueous dispersion coating material, a poly-solvent coating material, a powder coating material, a slurry coating material and an aqueous coating material.

The above-mentioned metallic powder and the color pigment are also not particularly limited. Concrete examples of the metallic powder are, aluminum powder, copper powder and the like. Furthermore, mica powder and the like can be also added thereto. Also, Concrete examples of the color pigment are, for instance, an organic pigment such as phthalocyanine blue, toluidine red or benzidine yellow, and an inorganic pigment such as titanium dioxide, carbon black or iron oxide red. These metallic powder and color pigment can be used alone or in an admixture thereof, respectively.

Moreover, when the above-mentioned ultraviolet absorber and the light stabilizer are added to the base coat, weatherability of the coated material can be more improved.

Also, in order to improve adhesion of a coating film of the coating material containing the metallic powder and/or color pigment to a coating film of the top coat clear coating material, to the coating material may be added an aminosilane compound such as aminoethylaminopropyltrimethoxysilane, γ-aminopropyltrimethoxysilane, γ-aminopropyldimethoxysilane, γ-aminopropyltriethoxysilane or 3-aminopropyldiethoxysilane.

It is desired that the amount of the above-mentioned aminosilane compound is, as usual, at most 20 parts, preferably at most 10 parts, and at least 0.5 part based on 100 parts of the coating material containing the metallic powder and/or color pigment.

The coated material of the present invention is one obtained by further coating the top coat clear coating material on the surface of the coating of the base coat. The coated material can be produced by a method, e.g. a two coat-one bake method comprising coating the above-mentioned coating material containing metallic powder and/or color pigment on a coating object, allowing to stand for several minutes, then coating the top coat clear coating material thereon in a wet-on-wet manner and thermally curing it; or a two coat-two bake method comprising coating the coating material containing metallic powder and/or color pigment on a coating object, thermally curing it, then coating the top coat clear coating material thereon and thermally curing it.

The top coat clear coating material can be coated by various methods conventionally employed, such as dipping method, spraying method, brushing method and a method by using a roll coater or a flow coater. After the coating, by heating the coated surface to at least 30° C., preferably 55° to 350° C., the top coat clear coating material coated thereon can be cured.

The thickness of a coating film of the coated material cannot be unconditionally defined because it varies according to the use. From the viewpoint of hiding property and the like, it is desired that the thickness of the coating film formed from the coating material containing metallic powder and/or color pigment is 10 to 30 μm or so, and from the viewpoint of durability and the like, it is desired that the thickness of the coating film formed from the top coat clear coating material is 20 to 50 μm or so.

As aforementioned, the curable composition suitable as a top coat of the present invention shows an extremely excellent stain resistance in addition to excellent acid resistance, scratch resistance, appearance, thermosetting property and the like. Also, the composition can be suitably used as a top coat for, for instance, automobiles, industrial equipments, steel furnitures, interior and exterior of buildings, household electric appliances, plastics and the like, and as, in particular, a top coat for automobiles and the like.

Accordingly, the coated material using the above-mentioned curable composition of the present invention is excellent in the above-mentioned acid resistance, scratch resistance, appearance and thermosetting property, and is extremely excellent in stain resistance.

Next, the curable composition suitable as a top coat and the coated material using the same of the present invention are explained in more detail based on the Examples, and it is to be understood that the present invention is not limited to these Examples.

PREPARATION EXAMPLES 1 to 2

(PREPARATION OF COMPONENTS (A-a) and (A-b))

A reactor equipped with a stirrer, a thermometer, a reflux condenser, a tube for introducing nitrogen gas and a dropping funnel was charged with 26 parts of Solvesso 100 (aromatic petroleum solvent made by Exxon Chemical Co.), and the reactor was heated to 110° C. with introducing nitrogen gas thereto, and then, a mixture of the polymerizable component (A) of which composition and amount are shown in Table 1, 4.75 parts of 2,2-azobisisobutyronitrile, 3.5 parts of Solvesso 100 and 2 parts of methanol was added dropwise to the reactor at a constant rate through the dropping funnel over 4 hours.

After finishing adding dropwise the mixture, 0.25 part of 2,2'-azobisisobutyronitrile and 10 parts of xylene were added dropwise thereto at a constant rate over 30 minutes, and the polymerization was carried out for 1 hour and 30 minutes, and then, it was cooled. Next, thereto were added 4 parts of methyl orthoacetate and 4 parts of methanol, and further, Solvesso 100 was added thereto to give a solution of component (A-a) and a solution of component (A-b), which have a concentration of resin solid matter of 60% by weight.

The number average molecular weight of the obtained components (A-a) and (A-b) was examined. Also, based on the amount of the used polymerizable component (A), the reactive silyl group equivalent (g/mole), the alcoholic hydroxyl group equivalent (g/mole) and the molar ratio of the alcoholic hydroxyl group to the reactive silyl group (alcoholic hydroxyl group/reactive silyl group) were calculated. The results are shown in Table 1.

TABLE 1

| Component (A) | A-a | A-b |
|---|---|---|
| Polymerizable component (A) (parts) | | |
| Monomer (A-1) | | |
| γ-Trimethoxysilylpropyl methacrylate | 30.0 | 40.0 |
| Monomer (A-2) | | |
| 2-Hydroxyethyl methacrylate | 13.2 | 26.0 |
| Monomer (A-3) | | |
| Styrene | 15 | 13 |
| Methyl methacrylate | 25.0 | — |
| n-Butyl methacrylate | 16.8 | 11 |
| Cyclohexyl methacrylate | — | 10 |
| Number average molecular weight | 5200 | 5100 |
| Reactive silyl group equivalent (g/mole) | 827 | 620 |
| Alcoholic hydroxyl group equivalent (g/mole) | 984 | 500 |
| Molar ratio (hydroxyl group/silyl group) | 0.84 | 1.24 |

PREPARATION EXAMPLE 3

(PREPARATION OF COMPONENT (B-a))

By using raw materials shown in Table 2 in an amount shown in Table 2, a component (B-a) was prepared by the following method.

TABLE 2

| Raw material | Composition | Amount (g) |
|---|---|---|
| (1) | Solution composed of organic solvent-soluble polymer (62% by weight solution of acrylic polymer obtained by polymerizing polymerizable component (B-2) of 15% by weight of styrene, 28% by | 579 |

TABLE 2-continued

| Raw material | Composition | Amount (g) |
|---|---|---|
| | weight of butyl methacrylate, 30% by weight of butyl acrylate, 10% by weight of 2-hydroxyethyl acrylate, 2% by weight of acrylic acid and 15% by weight of ethyl methacrylate, solvent: mixture of 82% by weight of xylene and 18% by weight of 1-butanol) | |
| | Isopropanol | 22 |
| | Mineral spirits | 41 |
| | Heptane | 460 |
| | Xylene | 95 |
| (2) | t-Butyl peroctate | 1 |
| (3) | Methacrylic acid | 40 |
| | 2-Hydroxyethyl acrylate | 250 |
| | Methyl methacrylate | 365 |
| | Methyl acrylate | 180 |
| | Styrene | 150 |
| | Glycidal methacrylate | 15 |
| | Solution composed of organic solvent-soluble polymer (the same as shown in raw material (1)) | 290 |
| | Heptane | 26 |
| (4) | Mineral spirits | 148 |
| | 1-Butanol | 26 |
| | t-Butyl peroctate | 11 |
| (5) | t-Butyl peroctate | 8 |
| | 1-Butanol | 59 |
| | Heptane | 6 |

Firstly, a reactor was charged with the raw material (1) and heated to reflux temperature (97° C.). Next, the raw material (2) was added thereto, and after thereto were immediately added the raw material (3) and the raw material (4) at a constant rate over 225 minutes, respectively, its reflux temperature was maintained for 30 minutes. A reaction mixture was transparent at first, however, it was changed to light blue as soon as the raw material (3) and the raw material (4) were added thereto, and then, it became muddy in white after 40 minutes.

After that, the raw material (5) was added thereto at a constant rate over 30 minutes, and further, its reflux temperature was maintained for 90 minutes.

Finally, an excessive solvent was removed therefrom to give a stable dispersion (polymer) having a concentration of solid matter of 63.4% by weight, which was muddy in white but does not generate layer separation.

The obtained polymer had a Stormer viscosity of 76 KU and an average particle diameter of dispersed particle of 300 nm.

Moreover, "solution composed of organic solvent-soluble polymer" described in the column of raw material (1) is a solution obtained by polymerizing the polymerizable component (B-2) (which is described in parentheses) in the solvent (which is described in parentheses). The polymer forms the arm part (2).

Also, a polymer obtained by polymerizing the polymerizable component (B-1) comprising methacrylic acid, 2-hydroxyethyl acrylate, methyl methacrylate, methyl acrylate, styrene and glycidyl methacrylate which are described in the column of raw material (3) forms the core part (1).

PREPARATION EXAMPLE 4

(PREPARATION OF PRODUCT (A+B) OF COMPONENT (A) AND COMPONENT (B))

A reactor equipped with a stirrer, a thermometer, a reflux condenser, a tube for introducing nitrogen gas and a dropping funnel was charged with 15.6 parts of Solvesso 100, 10.4 parts of 1-butanol and 45 parts of the component (B-a) obtained in Preparation Example 3, and the reactor was heated to 110° C. with introducing nitrogen gas thereto, and then, a mixture of the polymerizable component (A) composed of 13 parts of styrene, 12 parts of n-butyl methacrylate, 10 parts of isobutyl methacrylate, 40 parts of γ-trimethoxysilylpropyl methacrylate and 25 parts of 2-hydroxyethyl methacrylate, 2 parts of methanol, 5.5 parts of 1-butanol, 8.2 parts of Solvesso 100 and 4.75 parts of 2,2'-azobisisobutyronitrile was added dropwise thereto at a constant rate through the dropping funnel over 5 hours.

After finishing adding dropwise the mixture, 0.25 part of 2,2'-azobisisobutyronitrile and 10 parts of xylene were added dropwise thereto at a constant rate over 30 minutes, and the polymerization was carried out for 1 hour and 30 minutes, and then, it was cooled. Next, thereto were added 4 parts of methyl orthoacetate and 2 parts of methanol, and further, Solvesso 100 was added thereto to give a product (A+B) having a concentration of resin solid matter of 60% by weight.

The number average molecular weight of the component (A) in the obtained product (A+B) was 5400. Also, as to the component (A) in the product (A+B), the reactive silyl group equivalent was 620 g/mole, the alcoholic hydroxyl group equivalent was 520 g/mole and the molar ratio of the alcoholic hydroxyl group to the reactive silyl group (alcoholic hydroxyl group/reactive silyl group) was 1.19.

Comparative Preparation Example 1

(Preparation of hydrolyzable silyl group-containing vinyl polymer (A'-a))

A reactor equipped with a stirrer, a thermometer, a reflux condenser, a tube for introducing nitrogen gas and a dropping funnel was charged with 26 parts of Solvesso 100, and the reactor was heated to 110° C. with introducing nitrogen gas thereto, and then, a mixture of a polymerizable component composed of 30 parts of γ-methacryloxypropyltrimethoxysilane, 25 parts of styrene, 20 parts of n-butyl methacrylate, 24 parts of methyl methacrylate and 1 part of acrylamide, 4.75 parts of 2,2'-azobisisobutyronitrile, 6 parts of Solvesso 100 and 6 parts of 1-butanol was added dropwise thereto at a constant rate through the dropping funnel over 5 hours.

After finishing adding dropwise the mixture, 0.25 part of 2,2'-azobisisobutyronitrile and 10 parts of toluene were added dropwise thereto at a constant rate over 1 hour, and the polymerization was carried out for 2 hours, and then, it was cooled. Furthermore, Solvesso 100 was added thereto to give a component (A'-a) having a concentration of resin solid matter of 60% by weight.

The number average molecular weight of the obtained component (A'-a) was 5200. Also, the reactive silyl group equivalent of the component (A'-a) was 827 g/mole.

Comparative Example 2

(Preparation of hydroxyl group-containing acrylic resin (A'-b))

A reactor equipped with a stirrer, a thermometer, a reflux condenser, a tube for introducing nitrogen gas and a dropping funnel was charged with 16 parts of Solvesso 100 and 10 parts of 1-butanol, and the reactor was heated to 110° C. with introducing nitrogen gas thereto, and then, a mixture of a polymerizable component composed of 28 parts of styrene, 10 parts of methyl methacrylate, 30 parts of n-butyl acrylate and 32 parts of FM-1 (made by Daicel Chemical Industries, Ltd.), 4.75 parts of 2,2'-azobisisobutyronitrile, 5 parts of Solvesso 100 and 10 parts of 1-butanol was added dropwise thereto at a constant rate through the dropping funnel over 5 hours.

After finishing adding dropwise the mixture, 0.25 part of 2,2'-azobisisobutyronitrile and 10 parts of toluene were added dropwise thereto at a constant rate over 1 hour, and the polymerization was carried out for 2 hours, and then, it was cooled. Furthermore, Solvesso 100 was added thereto to give a component (A'-b) having a concentration of resin solid matter of 60% by weight.

The number average molecular weight of the obtained component (A'-b) was 5500. Also, the alcoholic hydroxyl group equivalent of the component (A'-b) was 763 g/mole.

Comparative Preparation Example 3

(Preparation of crosslinked polymer fine particle (B'-a))

Preparation of trunk polymer

In order to prepare a trunk polymer, a glass reactor equipped with a stirrer, a thermometer, a reflux condenser and a tube for introducing nitrogen gas was charged with a raw material shown in Table 3.

TABLE 3

| Raw material (part(s)) | Distilled water | 200 |
| --- | --- | --- |
| | Butyl acrylate | 100 |
| | Triethylene glycol dimethacrylate | 1 |
| | Sodium dodecylbenzenesulfonate | 0.2 |
| | Pottasium persulfate | 0.05 |
| Glass transition temperature (°C.) | | −54 |

Next, these were heated to 55° C. with stirring in a stream of nitrogen gas, and as a result, the temperature in the reactor increased after 45 minutes. Then, this was cooled and maintained at 55° C., and the reaction was continued for 8 hours. The yield of a polymer (trunk polymer) in the obtained aqueous dispersion was 98%. The particle diameter calculated based on cloudiness of the aqueous dispersion was 0.15 μm.

Also, after the aqueous dispersion was salted out and solidified with calcium chloride, it was washed with water and methanol, and then, it was dried in a pressure reducing dryer. The dried polymer was picked into a 100 mesh stainless steel wire net and immersed in toluene solvent in a dark place for 48 hours. Next, after the deposited toluene was wiped away, the weight was measured, and after it was dried in the pressure reducing dryer over again, the weight was measured, so that swelling degree and gel content were calculated based on the following equations.

$$\text{Swelling degree} = \frac{\text{(Weight after swelling)} - \text{(Weight after redrying)}}{\text{(Weight after redrying)}}$$

$$\text{Gel content (\% by weight)} = \frac{\text{(Weight after redrying)}}{\text{(Amount of picked sample)}} \times 100$$

As a result, as to the trunk polymer, the swelling degree was 10.1 and the gel content was 93% by weight.

Also, the glass transition temperature of the trunk polymer was −54° C.

(ii) Preparation of graft polymer

The reactor used for the preparation of the trunk polymer was equipped with an addition device for monomers and charged with components shown in Table 4 (trunk polymer aqueous dispersion: aqueous dispersion of trunk polymer obtained in the above-mentioned item (i), and after 45 parts of a monomer mixture of 40% by weight of styrene and 60% by weight of methyl methacrylate, which contains 0.2 part of cumene hydroperoxide was added dropwise thereto with stirring in a stream of nitrogen gas at 60° C. over 4 hours and polymerized, the polymerization was finished with further maintaining for 1 hour. The conversion was 95% and the average particle diameter of the polymer was 0.3 μm. To the obtained aqueous dispersion was added 1 part of 2,6-di-t-butyl-p-cresol, and after they were salted out and solidified by adding a calcium chloride solution, they were warmed and granulated, and then, they were dehydrated, washed and dried to give a crosslinked polymer fine particle (B'-a).

TABLE 4

| Component | Amount (part)s)) |
| --- | --- |
| Trunk polymer aqueous dispersion (as polymer solid matter) | 55 |
| Distilled water (containing water from aqueous dispersion) | 200 |
| Sodium formaldehyde sulfoxylate (SFS) | 0.4 |
| Ethylenediaminetetraacetic acid.2Na (EDTA-2Na) | 0.01 |
| Iron (II) sulfate | 0.005 |

Examples 1 to 6 and Comparative Examples 1 to 7

These were blended the component (A) obtained in Preparation Examples 1 and 2, the vinyl polymer and the acrylic resin (component (A')) obtained in Comparative Preparation Examples 1 and 2, the component (B) obtained in Preparation Example 3, the product (A+B) obtained in Preparation Example 4, the crosslinked polymer fine particle (component (B')) obtained in Comparative Preparation Example 3, and the component (C), the component (D) and the component (E) described in Table 5 to have the composition as described in Table 5, and to 100 parts of the total amount of solid matters of the above-mentioned components were added 0.4 part of a leveling agent (DISPARLON L-1984-50 made by Kusumoto Chemicals Ltd.), 2 parts of Tinuvin 384 (made by Ciba-Geigy AG.) as an ultraviolet absorber and 1 part of Tinuvin 123 (made by Ciba-Geigy AG.) as a light stabilizer to give a mixture. After that, the mixture was diluted by using Solvesso 100 so that the viscosity measured by Ford viscosity cup No. 4 was about 22 seconds, to give a clear coating material for top coating.

The thermosetting property of the obtained clear coating material for top coating was evaluated in accordance with the following method. Also, the acid resistance, scratch resistance, appearance, impact resistance and stain resistance of the coating film were evaluated in accordance with the following methods. The results are shown in Table 6.

(i) Thermosetting property (Gel fraction)

The clear coating material for top coating was coated on tin foil and baked at 140° C. for 30 minutes to give a clear film having a thickness of about 40 μm. This clear film was cut in about 50 mm×50 mm, and it was peeled from the tin foil and wrapped with a previously exactly weighed 200 mesh stainless steel wire net ($W_0$), and the weight ($W_1$) was exactly measured. After that, this was immersed in acetone for 24 hours for extraction, and then, it was dried and the weight ($W_2$) was exactly measured, so that the gel fraction (% by weight) was calculated based on the equation:

Gel fraction (% by weight)={(($W_2$)−($W_0$))/(($W_1$)−($W_0$))}×100

(ii) Acid resistance, Scratch resistance, Appearance and Impact resistance

Preparation of coating film

By using a coated plate obtained by coating an expoxy amide cationic electroprimer for automobiles and an intermediate surfacer on a steel plate which was previously degreased and subjected to a phosphatizing treatment, as a test piece, an acrylic melamine resin coating material (black) was coated as a base coat on the surface of the test piece. After this was allowed to stand at ordinary temperature for 5 to 10 minutes, the above-mentioned clear coating material for top coating was coated thereon in a wet-on-wet manner, and it was allowed to stand at ordinary temperature for 10 minutes, and then, it was baked at 140° C. for 30 minutes to form a coating film.

As to the obtained coating film, the dry thickness of the base coat was about 15 μm and the dry thickness of the clear top coat was about 30 to about 40 μm.

② Acid resistance

After four drops of a 40% aqueous solution of sulfuric acid were dropped on the obtained coating film by using a pipette and the film was heated at 70° C. for 30 minutes, the aqueous solution of sulfuric acid was washed away with water, and the change of the surface of the coating film was observed with the naked eyes and evaluated based on the following criteria.

(Criteria for evaluation)

10: There is no change as compared with the surface before dropping.
9: Slight change is observed.
8: Circular marks remain.
7: Discoloration or blister is slightly observed.
6: Lowering of gloss or discoloration is slightly observed.
5: Lowering of gloss or discoloration is clearly observed.
4: Slight shrinking or clear blister is observed.
3: Slight lifting, or marked shrinking and discoloration is observed.
2: Lifting is clearly observed.
1: Disolution of the coating film is observed.

② Scratch resistance (Gloss retention)

1e;2qA test piece (150 mm×100 mm) on which the coating film was formed was horizontally fixed, and after an abrasive (mixture of 1.2% by weight of JIS class 8 loam, 1.2% by weight of JIS class 11 loam, 0.6% by weight of kaolin, 1% by weight a neutral detergent and 96% by weight of water) was coated on the coating film in an amount of about 0.05 g/cm², a weight (diameter of contact surface: 5 cm, load: 22 g/cm²) covered with kraft paper was stroked against the surface.

The 20° gloss of the surface of the coating film before stroke of the weight and after 20 strokes of the weight was measured by using a glossmeter (made by Murakami Color Research Laboratory), and the gloss retention (%) after 20 strokes was calculated based on the equation:

Gloss retention (%)=(Gloss after stroke/Gloss before stroke)×100

Moreover, the larger the above-mentioned gloss retention, the more excellent the scratch resistance.

③ Appearance

The sharpness of the coating film was measured by using an image clarity measuring device (made by Suga Test Instruments Co., Ltd., model ICM-1-DP, width of slit: 0.5 mm).

Moreover, the larger the above-mentioned value of sharpness, the more excellent the appearance.

④ Impact resistance

By using a Du Pont impact tester (made by Toyo Seiki Seisaku-sho, Ltd.), a weight of 500 g was fallen on a test piece (150 mm×100 mm) on which a coating film was formed under the condition that the tip radius for impact was ½ inch, and the maximum height (cm) at which no crack was generated in the surface of the coating film was measured. The height of the weight fallen was increased 5 cm at a time.

(iii) Stain resistance

By using a coated plate obtained by coating an epoxy amide cationic electroprimer for automobiles and an intermediate surfacer on a steel plate which was previously degreased and subjected to a phosphatizing treatment, as a test piece, an acrylic melamine resin coating material (white) was coated as a base coat on the surface of the test piece. Next, after the above-mentioned clear coating material for top coating was coated thereon in a wet-on-wet manner and it was allowed to stand at ordinary temperature for 10 minutes, it was baked at 140° C. for 30 minutes to form a coating film.

As to the obtained coating film, the dry thickness of the base coat was about 15 μm and the dry thickness of the clear top coat was about 30 to about 40 μm.

The initial color of the obtained coating film and the color of the coating film subjected to outdoor exposure for 3 months between August and November at Settsu-shi, Osaka, Japan with the specimen faced the south at 30° to the horizontal were measured by using a color difference glossmeter model CDX-101 (made by Murakami Color Research Laboratory), respectively, and on the basis of the obtained L values (brightness), the difference (ΔL value) was calculated.

Moreover, the codes in Table 5 are as follows:

(D-a): Dodecylbenzenesulfonic acid/Diisopropanolamine/Isobutyl alcohol (weight ratio)= 20/8.4/71.6

(D-b): NACURE5225 (made by KING INDUSTRIES, Dodecylbenzenesulfonic acid blocked with amine (amine salt of dodecylbenzenesulfonic acid))

(E-a): CYMEL235 (made by MITSUI-CYTEC, LTD., amino resin)

Also, in Comparative Example 4, an acrylic melamine coating material was used instead of the components (A), (A'), (B), (B'), (C), (D) and (D), and the product (A+B), and the clear coating material for top coating was prepared.

TABLE 5

| | Composition (parts) | | | | | | |
|---|---|---|---|---|---|---|---|
| | Component (A) (Solid matter) | | Component (A') (Solid matter) | | Component (B) (Solid matter) | Component (B') (Solid matter) | Product (A+B) (Solid matter) |
| | (A-a) | (A-b) | (A'-a) | (A'-b) | (B-a) | (B'-a) | (A+B) |
| Ex. No. | | | | | | | |
| 1 | 100 | — | — | — | 33.3 | — | — |
| 2 | 100 | — | — | — | 43 | — | — |
| 3 | 100 | — | — | — | 33.3 | — | — |

TABLE 5-continued

| | | | | | | | |
|---|---|---|---|---|---|---|---|
| 4 | — | 100 | — | — | 66.7 | — | — |
| 5 | — | 100 | — | — | 25 | — | — |
| 6 | — | — | — | — | — | — | 100 |
| Com. Ex. | | | | | | | |
| 1 | 100 | — | — | — | 25 | — | — |
| 2 | 100 | — | — | — | — | — | — |
| 3 | — | 100 | — | — | — | — | — |
| 4 | — | — | — | — | — | — | — |
| 5 | 80 | — | 20 | — | — | — | — |
| 6 | — | — | 60 | 40 | — | 10 | — |
| 7 | — | — | 100 | — | 33.3 | — | — |

| | Composition (parts) | | | | | |
|---|---|---|---|---|---|---|
| | Component (C) | | | Component (D) | | Component (E) |
| | ESI28 | ESI40 | MSI51 | (D-a) | (D-b) | (E-a) |
| Ex. No. | | | | | | |
| 1 | — | — | 26.7 | 4 | — | — |
| 2 | — | 14.3 | 14.3 | — | 3.4 | — |
| 3 | 26.7 | — | — | 4 | — | — |
| 4 | — | — | 66.7 | 5.8 | — | 5.4 |
| 5 | — | — | 25 | — | 3 | — |
| 6 | — | 10 | 10 | — | 2.4 | — |
| Com. Ex. | | | | | | |
| 1 | — | — | — | 3.1 | — | — |
| 2 | — | — | — | 2.5 | — | — |
| 3 | — | — | 25 | — | 2.5 | — |
| 4 | — | — | — | — | — | — |
| 5 | — | — | — | — | 2 | — |
| 6 | — | — | — | — | 2.4 | — |
| 7 | — | — | — | — | 2.7 | — |

TABLE 6

| | Physical properties | | | | | |
|---|---|---|---|---|---|---|
| | Thermosetting property (Gel fraction (% by weight)) | Acid resistance | Scracth resistance (Gloss retention (%)) | Appearance (Sharpenss (-)) | Impact resistance (Maximum height (cm)) | Stain resistance (ΔL value) |
| Ex. No. | | | | | | |
| 1 | 95 | 9 | 71 | 93 | 40 | −1.7 |
| 2 | 93 | 9 | 70 | 91 | 45 | −1.8 |
| 3 | 94 | 9 | 72 | 90 | 40 | −2.0 |
| 4 | 96 | 9 | 75 | 92 | 40 | −1.2 |
| 5 | 94 | 10 | 71 | 92 | 35 | −1.4 |
| 6 | 95 | 9 | 76 | 93 | 40 | −1.6 |
| Com. Ex. | | | | | | |
| 1 | 93 | 8 | 70 | 92 | 45 | −7.3 |
| 2 | 92 | 9 | 40 | 90 | 25 | −7.1 |
| 3 | 92 | 9 | 42 | 91 | 20 | −1.8 |
| 4 | 94 | 1 | 36 | 91 | 35 | −7.6 |
| 5 | 92 | 9 | 54 | 90 | 20 | −6.5 |
| 6 | 90 | 5 | 58 | 85 | 30 | −7.9 |
| 7 | 89 | 8 | 60 | 87 | 35 | −7.4 |

From the results shown in Table 6, it can be understood that all coating materials obtained in Examples 1 to 6 are coating materials which are excellent in thermosetting property, and that all coating films formed from the coating materials are extremely excellent in stain resistance in addition to being excellent in acid resistance, scratch resistance, appearance and impact resistance.

INDUSTRIAL APPLICABILITY

The curable composition suitable as a top coat of the present invention shows an excellent thermosetting property, and the coating film formed from the curable composition is excellent in acid resistance, scratch resistance, appearance and impact resistance, and is extremely excellent in stain resistance.

Accordingly, the curable composition suitable as a top coat of the present invention is a composition which can be suitably used as a top coat for, for instance, automobiles, industrial equipments, steel furnitures, interior and exterior of buildings, household electric appliances, plastics and the like.

Also, the coated material obtained by coating the curable composition suitable as a top coat of the present invention has the above-mentioned excellent properties.

We claim:

1. A curable composition suitable as a top coat which contains (A) a vinyl copolymer having a main chain consisting essentially of a vinyl copolymer chain, in which a reactive silyl group represented by the formula (I):

wherein $R^1$ is hydrogen atom or an alkyl group having 1 to 10 carbon atoms, $R^2$ is hydrogen atom or a monovalent hydrocarbon group selected from the group consisting of an alkyl group having 1 to 10 carbon atoms, an aryl group and an aralkyl group, and a is 0, 1 or 2, is combined with a carbon atom in the molecule at the main chain end and/or side chain of said copolymer, said copolymer having at least one alcoholic hydroxyl group at its main chain end and/or side chain and having an alcoholic hydroxyl group equivalent of 400 to 2000 g/mole, (B) a non-aqueous dispersion of a hydroxyl group-containing polymer having a core part bonded to an arm part, said core part is insoluble in an organic solvent and said arm part is soluble in said organic solvent, which is obtained by polymerizing a polymerizable component (B-1) for said core part containing at least one member of vinyl monomers having hydroxyl group and at least one member of vinyl monomers having no hydroxyl group in said organic solvent solution containing an organic solvent-soluble polymer having a number average molecular weight of 1000 to 25000 and is obtained by polymerizing a polymerizable component (B-2) for said arm part comprising 5 to 30% by weight of at least one member of vinyl monomers having hydroxyl group and 70 to 95% by weight of at least one member of vinyl monomers having no hydroxyl group, and which is insoluble in said organic solvent and is dispersed in said organic solvent, (C) a tetraalkyl silicate and/or its partial hydrolysis condensation product where the alkyl group has 1 to 10 carbon atoms, and (D) a curing catalyst, wherein the amount of said non-aqueous hydroxyl group-containing polymer dispersion (B) is 5 to 100 parts by weight, in terms of solid matter, based on 100 parts by weight of said vinyl copolymer (A), the amount of said tetraalkyl silicate and/or its partial hydrolysis condensation product (C) is 2 to 100 parts by weight based on 100 parts by weight of said vinyl copolymer (A), and the amount of said curing catalyst (D) is 0.001 to 10 parts by weight based on 100 parts by weight of the total amount of solid matters of said vinyl copolymer (A), said non-aqueous hydroxyl group-containing polymer dispersion (B) and said tetraalkyl silicate and/or its partial hydrolysis condensation product (C).

2. The composition of claim 1, wherein as said vinyl copolymer (A) and said non-aqueous hydroxyl group-containing polymer dispersion (B), there is used a product obtained by polymerizing a mixture of (A) 60 to 90% by weight of a polymerizable component containing a reactive silyl group-containing vinyl monomer, an alcoholic hydroxyl group-containing vinyl monomer and other monomers copolymerizable with said reactive silyl group-containing vinyl monomer and said alcoholic hydroxyl group-containing vinyl monomer, and (B) 10 to 40% by weight of said non-aqueous hydroxyl group-containing polymer dispersion.

3. The composition of claim 1, wherein the reactive silyl group equivalent of said vinyl copolymer (A) is 380 to 5000 g/mole.

4. The composition of claim 1, wherein the molar ratio of the alcoholic hydroxyl group to the reactive silyl group (alcoholic hydroxyl group/reactive silyl group) in said vinyl copolymer (A) is 0.1 to 3.

5. The composition of claim 1, wherein said curing catalyst (D) is a sulfonic acid compound blocked with a nitrogen-containing compound, said nitrogen-containing compound being at least one compound selected from the group consisting of a primary or secondary amine compound having at least one hydroxyl group in one molecule, morpholine and oxazoline.

6. The composition of claim 1, to which an amino resin (E) is added in an amount of at most 30 parts by weight based on 100 parts by weight of the total amount of solid matters of said vinyl copolymer (A) and said non-aqueous hydroxyl group-containing polymer dispersion (B).

7. A coated material obtained by coating a top coat clear coating material on a surface of a coating formed from a coating material containing a metallic powder and/or a color pigment, wherein said top coat clear coating material contains the composition of claim 1 as a main component.

* * * * *